United States Patent
Iacovoni et al.

(10) Patent No.: US 9,556,661 B2
(45) Date of Patent: Jan. 31, 2017

(54) FRAMELESS-DOOR WINDOW OPERATING SYSTEM

(71) Applicant: FORD GLOBAL TECHNOLOGIES, LLC, Dearborn, MI (US)

(72) Inventors: Donald P. Iacovoni, Plymouth, MI (US); Howard Paul Linden, Southfield, MI (US); Paul L. Heirtzler, Northville, MI (US)

(73) Assignee: Ford Global Technologies, PLLC, Dearborn, MI (US)

( * ) Notice: Subject to any disclaimer, the term of this patent is extended or adjusted under 35 U.S.C. 154(b) by 0 days.

(21) Appl. No.: 14/546,416

(22) Filed: Nov. 18, 2014

(65) Prior Publication Data

US 2016/0138321 A1 May 19, 2016

(51) Int. Cl.
| | |
|---|---|
| *E05F 15/60* | (2015.01) |
| *E05F 15/70* | (2015.01) |
| *B60J 1/17* | (2006.01) |
| *E05B 81/00* | (2014.01) |
| *E05C 19/02* | (2006.01) |

(52) U.S. Cl.
CPC .................. *E05F 15/60* (2015.01); *B60J 1/17* (2013.01); *E05B 81/00* (2013.01); *E05C 19/02* (2013.01); *E05F 15/70* (2015.01)

(58) Field of Classification Search
CPC ........... E05F 15/60; E05F 15/70; E05C 19/02; B60J 1/17; E05B 81/00
USPC .......... 49/349; 292/336.3, 201, 216, DIG. 23
See application file for complete search history.

(56) References Cited

U.S. PATENT DOCUMENTS

| | | | |
|---|---|---|---|
| 4,571,884 A | | 2/1986 | Hetmann et al. |
| 5,810,423 A | | 9/1998 | Brackmann et al. |
| 8,827,027 B2 | * | 9/2014 | Syvret et al. ................. 180/281 |
| 9,140,047 B2 | * | 9/2015 | Zawade et al. |
| 2002/0108310 A1 | * | 8/2002 | Schroer .......................... 49/280 |
| 2007/0285218 A1 | * | 12/2007 | Fletcher et al. ............. 340/457 |
| 2012/0136532 A1 | * | 5/2012 | Konchan ......................... 701/36 |
| 2013/0055642 A1 | * | 3/2013 | Patterson ........................ 49/349 |
| 2014/0000165 A1 | * | 1/2014 | Patel et al. ........................ 49/31 |

FOREIGN PATENT DOCUMENTS

| | | |
|---|---|---|
| CN | 101280657 B | 6/2012 |
| DE | 19836761 C1 | 7/1999 |

OTHER PUBLICATIONS

English machine translation of CN101280657.
English machine translation of DE19836761.

* cited by examiner

*Primary Examiner* — Jerry Redman
(74) *Attorney, Agent, or Firm* — Jason Rogers; King & Schickli, PLLC

(57) ABSTRACT

A frameless-door window operating system is provided for a vehicle door. The system includes a door actuator, a door latch controller, a window controller and a door window displaceable between a closed position and an indexed position providing clearance to open the door.

12 Claims, 5 Drawing Sheets

FRAMELESS-DOOR WINDOW OPERATING SYSTEM

TECHNICAL FIELD

This document relates generally to the motor vehicle field and, more particularly, to a frameless-door window operating system.

BACKGROUND

A frameless door, such as commonly provided on convertible motor vehicles can be more susceptible to wind noise than a framed door. More particularly, without the structural door frame to provide support to the window, the window/door glass G may be pulled outboard off of the weather seals S by aerodynamic lifting forces on the glass at higher vehicle speeds (note action arrow A in FIG. 1a).

In order to mitigate this design weakness, it is common to provide a U-shaped seal retainer R which restrains the window glass G from deflecting outboard and losing contact with the seal S thereby limiting the occurrence of noise. The greater the penetration of the top edge E of the window glass G into the seal S, the greater the reduction in wind noise.

When the window glass G is located within the U-shaped seal retainer R, the top edge E of the glass G will impact the seal retainer R if the door swings open in the direction of action arrow B. In order to protect the window glass G and prevent this from happening, these types a frameless glass window operating systems invariably incorporate some form of "glass-index" function in which a window regulator is designed to drop the window by a small amount whenever the door is opened in order to create clearance between the top edge E of the window glass G and the seal retainer R (note action arrow C in drawing FIG. 1b).

FIG. 2 illustrates a prior art frameless-door glass window operating system wherein the operator manipulates the door handle DH to release the door latch DL and begin opening the door. The door motion is detected by an ajar switch AS which then sends a signal along the line L to the window regulator WR. In response to that signal, the window regulator WR displaces the window glass G down to the indexed position necessary to provide clearance of the seal retainer for opening the door (see FIG. 1b and note edge E of window glass G positioned lower than end M of retainer R). It should be appreciated that in this prior art frameless-door window operating system, the indexing function is not initiated until the door is already partially opened. Thus, the prior art system is susceptible to the edge E of the window glass G "clipping" the U-shaped retainer R if the vehicle operator opens the door quickly.

This document relates to a new and improved frameless-door glass window operating system that ensures that the window is properly indexed to clear the seal retainer R simultaneously and, more preferably, before the door is unlatched. This virtually eliminates any, possibility of the edge E of the window glass G clipping the retainer R since the window is indexed before the door is opened.

SUMMARY

In accordance with the purposes and benefits described herein, a frameless-door glass window operating system is provided for a vehicle door. That system comprises a door actuator, a door latch controller, a window controller and a door window which is displaceable between a closed position and an indexed position providing clearance to open the door. More specifically, a first trigger signal is sent from the door latch controller to the window controller to displace the window from the closed position to the indexed position prior to unlatching door.

In one possible embodiment the system includes a door lock module comprising the door latch controller, a latch actuator responsive to the door latch controller and a lock assembly. That lock assembly may include a latch and a cooperating strike plate.

In one possible embodiment, the system further includes a window regulation module comprising the window controller and a motor for raising and lowering the door window.

In one possible embodiment, the door actuator includes a fixed door handle. In one possible embodiment, the door actuator is a push button. In one possible embodiment the door actuator is a touch sensor.

In one possible embodiment, the system further includes a signal line extending between the door latch controller and the window controller. This signal line not only provides a pathway for the first trigger signal but also a second trigger signal which is sent from the door latch controller to the window controller to displace the window from the indexed position to the fully closed position after the door is latched in the closed position.

In accordance with an additional aspect, a method of indexing a frameless-door glass window to provide clearance for opening a vehicle door is provided. That method comprises the sending of a trigger signal from a door latch controller to a window controller to displace the window from a closed position to an indexed position simultaneously with or prior to unlatching the door. In one possible embodiment, the method includes sending that trigger signal at least 30 ms before unlatching the door.

In the following description, there are shown and described several preferred embodiments of the frameless-door window operating system. As it should be realized, the system is capable of other, different embodiments and its several details are capable of modification in various, obvious aspects all without departing from the system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the frameless-door window operating system and together with the description serve to explain certain principles thereof. In the drawing figures.

Reference will now be made in detail to the present preferred embodiment of the current frameless-door glass window operating system, examples of which are illustrated in the accompanying drawing figures.

DETAILED DESCRIPTION

Figure 3:
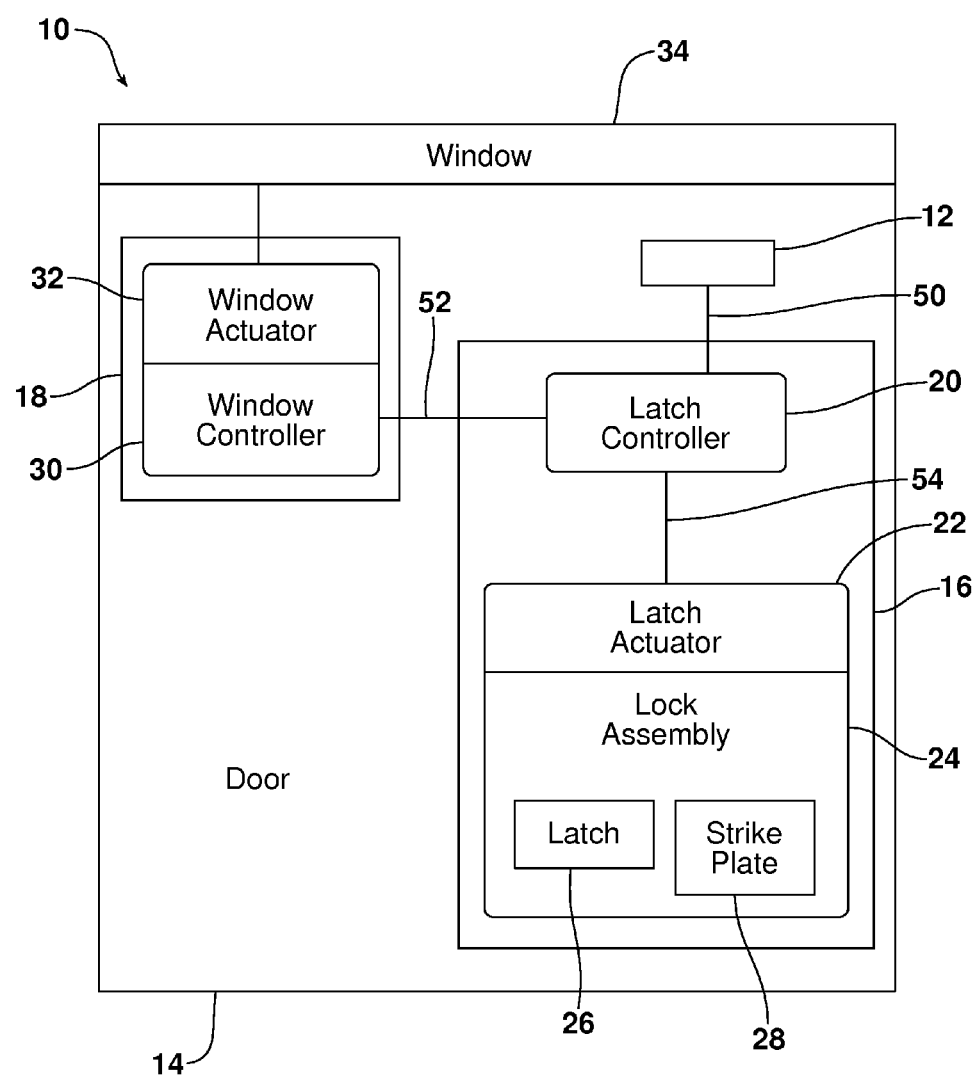
FIG. 3 is a schematic block diagram of the new and improved frameless-door glass window operating system that is the subject of this document.

Reference is now made to FIG. 3 which is a schematic illustration of the frameless-door glass window operating system 10. The system 10 includes a door actuator 12 that is utilized to open or close the vehicle door 14. In one possible embodiment, the door actuator 12 includes a fixed door handle, a push button, a touch sensor or any combination thereof. Where the door actuator 12 is a push button, the vehicle operator pushes the door actuator to unlatch the door 14 and allow it to open. Opening may be performed manually or by means of an automatic drive system.

As further illustrated in FIG. 3, the system 10 also includes a door lock module 16 and a window regulation module 18. More specifically, the door lock module 16 includes a latch controller 20, a latch actuator 22, responsive to the door latch controller, and a lock assembly 24. In one possible embodiment, the lock assembly 24 includes a latch 26 and a cooperating strike plate 28. In one possible embodiment, the window regulation module 18 includes a window controller 30 and a window actuator 32 that is responsive to the window controller and functions to raise and lower the door window 34.

Figure 4:
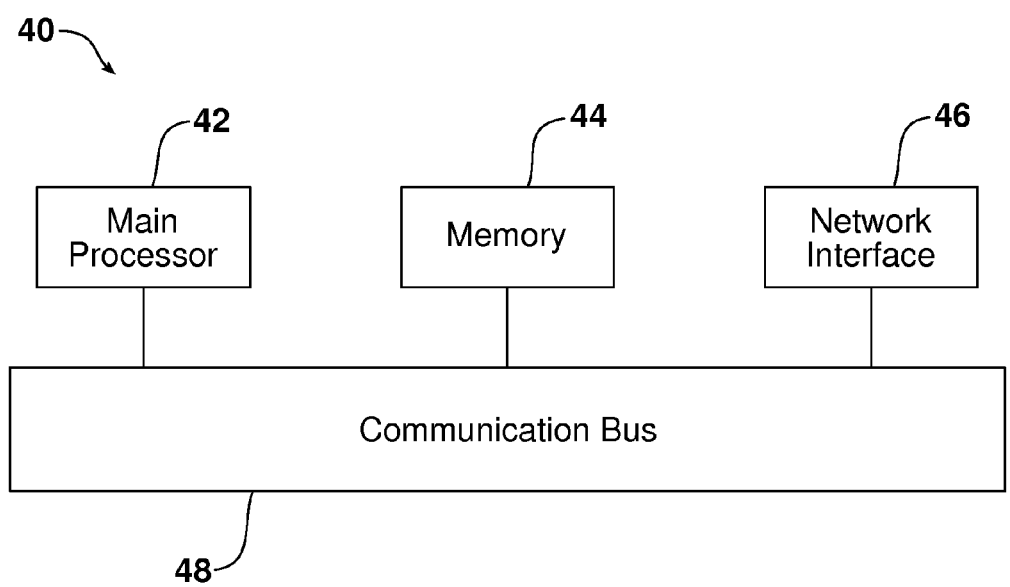
FIG. 4 is a schematic block diagram of an embodiment of an electronic control unit useful in the operating system.

The latch controller 20 and the window controller 30 may each comprise a separate electronic control unit (ECU) 40 (see FIG. 4). In one possible embodiment, each ECU 40 comprises one or more processors 42, one or more memories 44 and one or more network interfaces 46 (see FIG. 4). As should be appreciated, all of these components 42, 44, 46 communicate with each over a communication bus 48.

Figure 1A:
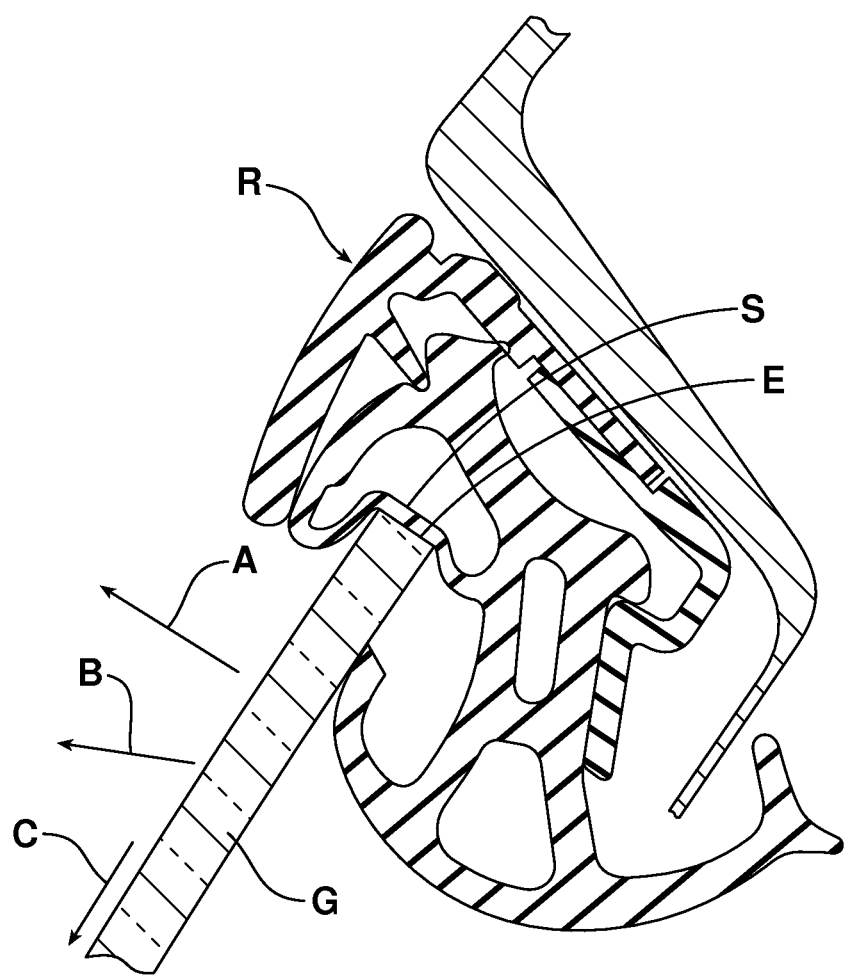
FIG. 1a is a schematic cross-sectional view illustrating the door glass, the header seal and the seal retainer of a typical frameless-door window with the glass window illustrated in the fully closed position.
Figure 1B:
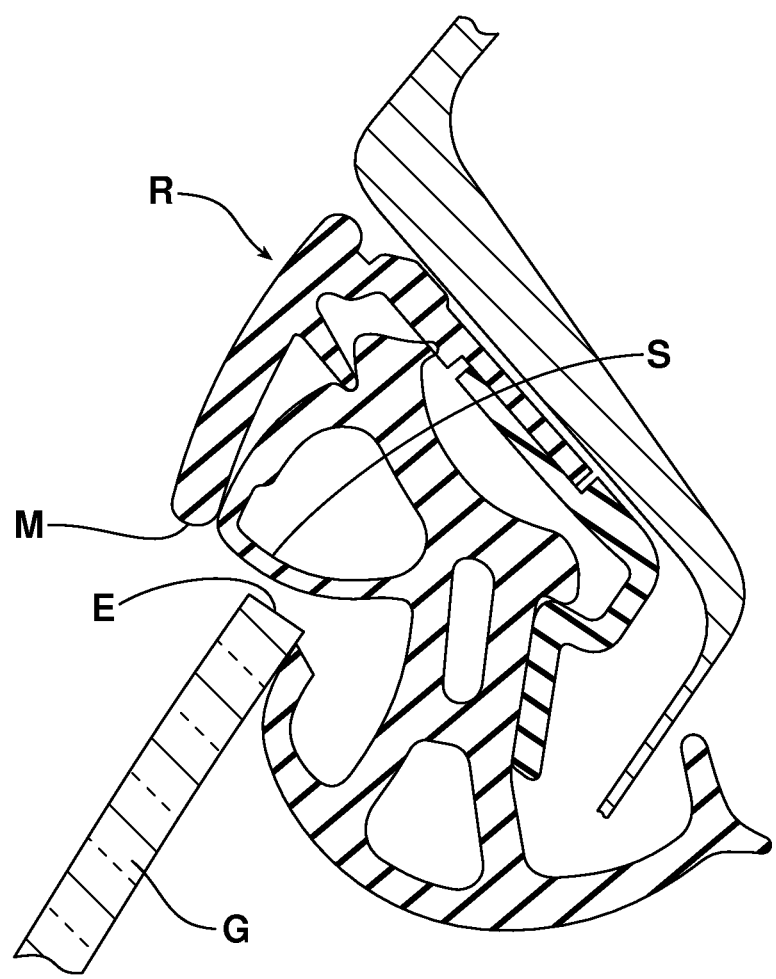
FIG. 1b is a view similar to FIG. 1a but showing the window in the indexed position wherein clearance is provided between the top edge of the window and the lowermost edge of the seal retainer so as to allow opening the door without clipping the window on the seal retainer.
Figure 2:
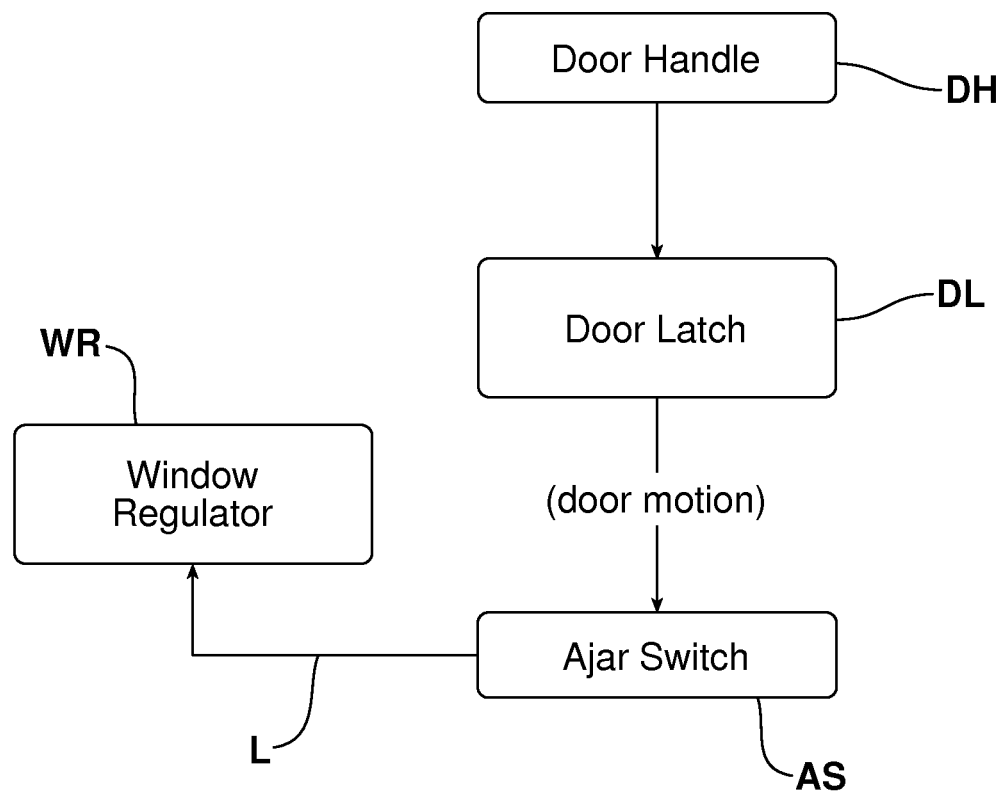
FIG. 2 is a schematic block diagram of a prior art frameless-door glass window operating system wherein the signal pathway incorporates the door ajar switch.

The operation of the frameless-door glass window operating system 10 will now be described with reference to FIGS. 1a, 1b and 3. When the door 14 and window 34 are both closed as illustrated in FIG. 1a and the operator wishes to open the door, the operator engages the door actuator 12. An operation signal is then sent along the control or signal line 50 from the actuator 12 to the latch controller 20. Latch controller 20 is responsive to that signal and immediately sends a first trigger signal along the control or signal line 52 to the window controller 30. Window controller 30 is responsive to the first trigger signal and provides a control signal to the window actuator 32 to index the window 34 from the fully closed position illustrated in FIG. 1a to the indexed position illustrated in FIG. 1b. As previously noted, when the window is indexed as illustrated in FIG. 1b, the upper edge E of the window 34 is lowered sufficiently to provide clearance between that edge and the lower edge or tip M of the seal retainer R thereby allowing the door to be opened without clipping the window on the retainer.

When the latch controller 20 receives the control signal from the door actuator 12, the latch controller also sends a control signal along control or signal line 54 to the latch actuator 22. The latch actuator 22 then sends a control signal to the lock assembly 24 releasing the latch 26 from the strike plate 28 to allow the door 14 to open.

It should be appreciated that the latch controller 20 sends the trigger signal along line 52 to the window controller 30 simultaneously with or prior to sending the control signal along line 54 to the latch actuator 22. This ensures that the window 34 is properly indexed and the clearance is provided between the window and the seal retainer R before the door is opened. In one particularly useful embodiment, the first trigger signal is sent to the window controller 30 at least 30 ms before the control signal is sent to the latch actuator 22.

It should be appreciated that the window 34 is maintained in the indexed position until the door 40 is again closed and this is confirmed by the latch controller 20. Thus, the necessary clearance between the window 34 and the seal retainer R is maintained by the system when the door 14 is closed thereby preventing any possible clipping of the window on the retainer during the closing operation. Once the latch controller 20 confirms that the door 14 is closed and the latch 26 is properly engaging the strike plate 28, the latch controller 20 sends a second trigger signal along the control line 52 to the window controller 30. Upon receipt of this second trigger signal, the window controller 30 sends a control signal to the window actuator 32 causing the window actuator to raise the window 34 to the fully closed position illustrated in FIG. 1a. This ensures the best possible sealing and noise suppression during subsequent operation of the vehicle at speed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A frameless-door window operating system for a vehicle door, comprising:
   a door actuator;
   a door latch controller;
   a window controller;
   a signal line extending between said door latch controller and said window controller; and
   a door window displaceable between a closed position and an indexed position providing clearance to open the door;
   whereby a first trigger signal is sent from said door latch controller to said window controller to displace said window from the closed position to the indexed position prior to unlatching the door and a second trigger signal is sent from said door latch controller to said window controller to displace the window from said indexed position to said fully closed position after the door is latched in said closed position.

2. The operating system of claim 1, wherein said system includes a door lock module comprising said door latch controller, a latch actuator responsive to said door latch controller and a lock assembly.

3. The operating system of claim 2, wherein said lock assembly includes a latch and a cooperating strike plate.

4. The operating system of claim 3, wherein said system further includes a window regulation module comprising said window controller and a window actuator for raising and lowering said door window.

5. The operating system of claim 4, wherein said door actuator includes a fixed door handle.

6. The operating system of claim 5, wherein said door actuator is a push button.

7. The operating system of claim 5, wherein said door actuator is a touch sensor.

8. The operating system of claim 1, wherein said system further includes a window regulation module comprising said window controller and a window actuator for raising and lowering said door window.

9. A frameless-door glass window operating system for a vehicle door, comprising:
   a door actuator;
   a door latch controller;
   a window controller; and
   a door window which is displaceable between a closed position and an indexed position providing clearance to open the door;
   whereby a first trigger signal is sent from said door latch controller to said window controller to displace said window from the closed position to the indexed position prior to unlatching the door and a second trigger signal is sent from said door latch controller to said window controller to displace the window from said indexed position to said fully closed position after the door is latched in said closed position.

10. The operating system of claim 9, wherein said system includes a door lock module comprising said door latch controller, a latch actuator responsive to said door latch controller and a lock assembly.

11. The operating system of claim 10, wherein said lock assembly includes a latch and a cooperating strike plate.

12. The operating system of claim 11, wherein said system further includes a window regulation module comprising said window controller and a window actuator for raising and lowering said door window.

\* \* \* \* \*